US011791613B2

(12) United States Patent
Yoon

(10) Patent No.: US 11,791,613 B2
(45) Date of Patent: Oct. 17, 2023

(54) CABLE SUPPORT MODULE AND CABLE UNIT COMPRISING SAME

(71) Applicants: W. L. Gore & Associates, Inc., Newark, DE (US); Jong Chul Yoon, Seoul (KR)

(72) Inventor: Jong Chul Yoon, Seoul (KR)

(73) Assignees: W. L. Gore & Associates, Inc., Newark, DE (US); Jong Chul Yoon, Seoul (KR)

( * ) Notice: Subject to any disclaimer, the term of this patent is extended or adjusted under 35 U.S.C. 154(b) by 297 days.

(21) Appl. No.: 17/423,286

(22) PCT Filed: Jan. 16, 2020

(86) PCT No.: PCT/KR2020/000765

§ 371 (c)(1),
(2) Date: Jul. 15, 2021

(87) PCT Pub. No.: WO2020/149652

PCT Pub. Date: Jul. 23, 2020

(65) Prior Publication Data

US 2022/0094150 A1 Mar. 24, 2022

(30) Foreign Application Priority Data

Jan. 16, 2019 (KR) ........................ 10-2019-0005503

(51) Int. Cl.

| | |
|---|---|
| ***H02G 7/10*** | (2006.01) |
| ***H02G 3/08*** | (2006.01) |
| ***H02G 11/00*** | (2006.01) |

(52) U.S. Cl.
CPC ................. *H02G 7/10* (2013.01); *H02G 3/08* (2013.01); *H02G 11/006* (2013.01)

(58) Field of Classification Search
None
See application file for complete search history.

(56) References Cited

U.S. PATENT DOCUMENTS 3,098,349 A * 7/1963 Waninger ................ B66C 13/12 174/69
5,343,989 A * 9/1994 Hu ....................... H02G 3/0475 174/136

(Continued)

*Primary Examiner* — Krystal Robinson
(74) *Attorney, Agent, or Firm* — GREENBERG TRAURIG, LLP

(57) ABSTRACT

The cable support module according to an illustrative embodiment of the present invention comprises: a metal plate which is flexible and the bending position varies along the length direction; fixing blocks which are fastened to the metal plate and wrapped around the top surface and bottom surface of the metal plate, and a plurality of fixing blocks are arranged at fixed intervals along the length direction of the metal plate; and connection blocks which have openings on one side surface that expose the accommodation groove therein so as to be fit-coupled to each fixing block together with the metal plate, and a plurality of the connection blocks are arranged in series next to each other so as to be continuously connected such that mutual rotation is possible, wherein the connection blocks can be coupled to each fixing block in a zig-zag from left to right on both sides along the length direction of the metal plate, and can be alternately connected together in a zig-zag along the length direction of the metal plate between the adjacent connection blocks.

10 Claims, 7 Drawing Sheets

110
100 111 112
200
231
220
220
204
206
220
230 202
11a
11
200
204
207
203
231
220

(56) References Cited

U.S. PATENT DOCUMENTS

| | | | | |
|---|---|---|---|---|
| 5,836,148 | A * | 11/1998 | Fukao | H02G 11/006 59/900 |
| 6,215,068 | B1 * | 4/2001 | Meier | H02G 11/00 191/12 C |
| 7,368,661 | B2 * | 5/2008 | Lalancette | H02G 3/08 439/535 |
| 8,882,052 | B2 * | 11/2014 | Komiya | G02B 6/4461 248/62 |
| 9,953,629 | B2 * | 4/2018 | Zalisk | G10K 11/22 |
| 10,083,777 | B2 * | 9/2018 | Tetsuka | F16G 13/18 |
| 10,221,919 | B2 * | 3/2019 | Tetsuka | H02G 11/00 |
| 10,377,327 | B1 * | 8/2019 | Katoh | H02G 3/0462 |
| 2004/0112625 | A1 * | 6/2004 | Sheikholeslami | F16G 13/16 174/111 |
| 2011/0121141 | A1 * | 5/2011 | Tatsuta | F16G 13/20 248/49 |
| 2011/0240805 | A1 * | 10/2011 | Komiya | F16G 13/20 248/68.1 |
| 2015/0360629 | A1 * | 12/2015 | Sekino | H02G 3/0475 174/68.3 |
| 2015/0372423 | A1 * | 12/2015 | Dickey | G05B 9/02 307/24 |

* cited by examiner

[Fig 1]
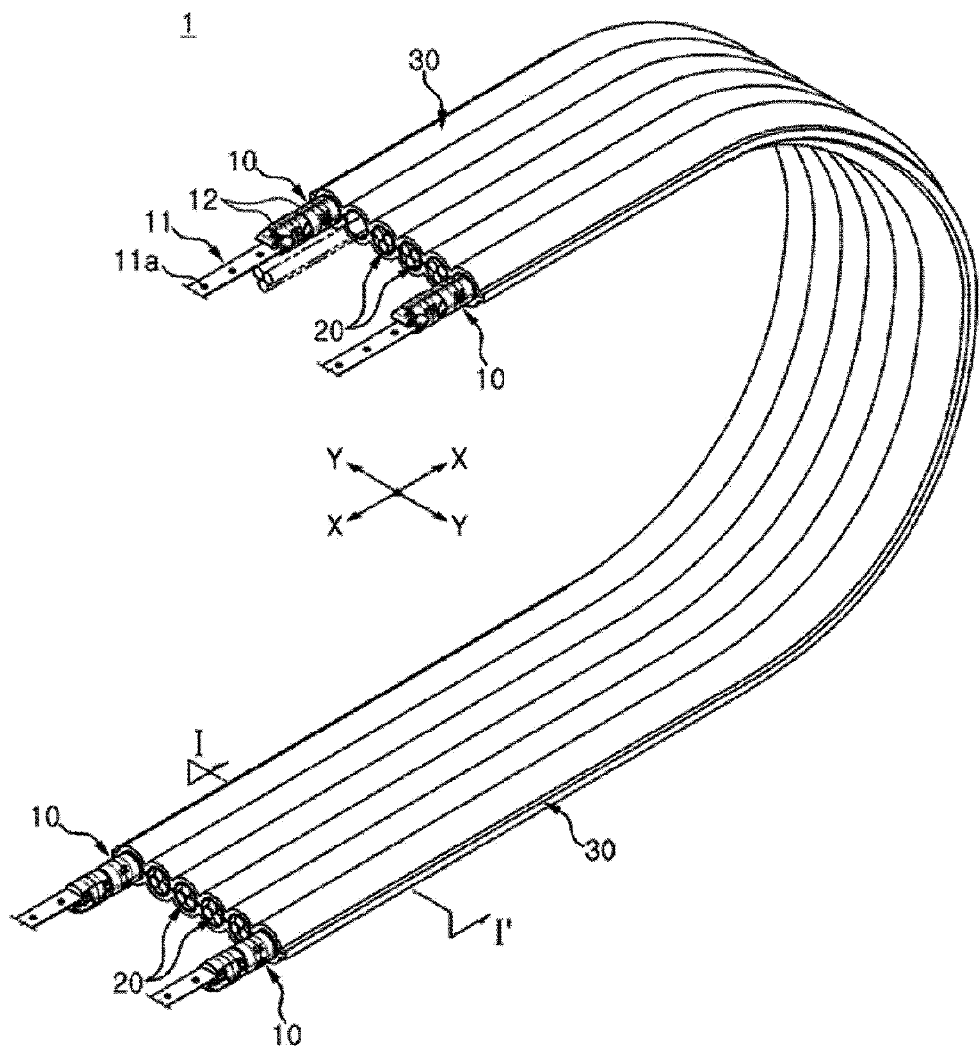
[Fig 2]
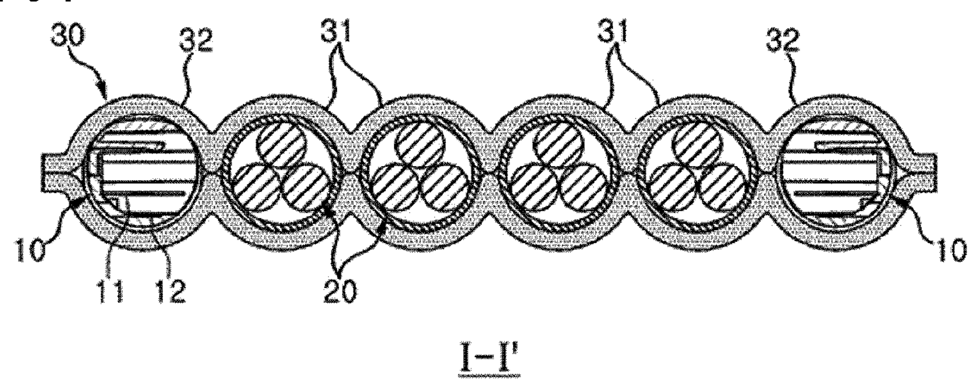

[Fig 3]
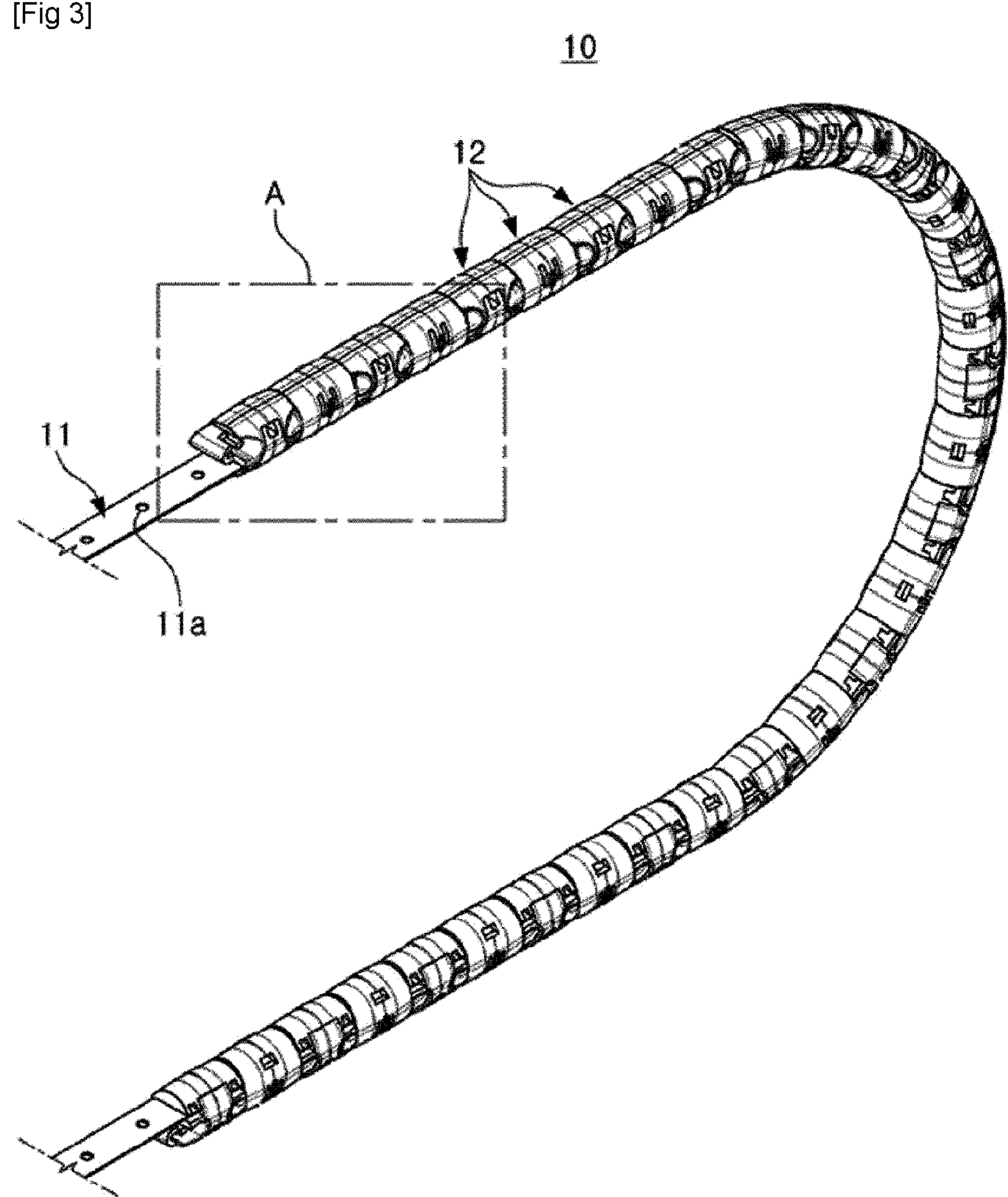

[Fig 4]
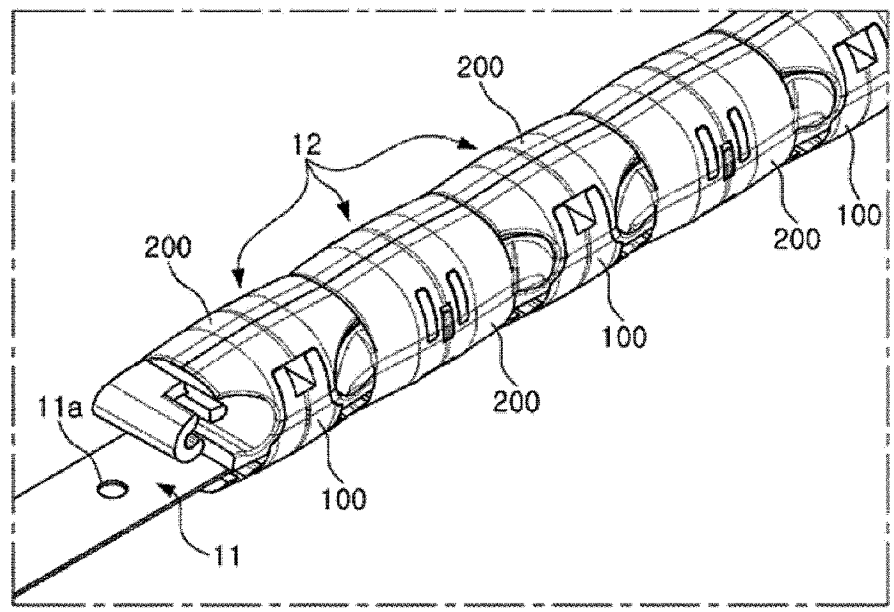
[Fig 5]
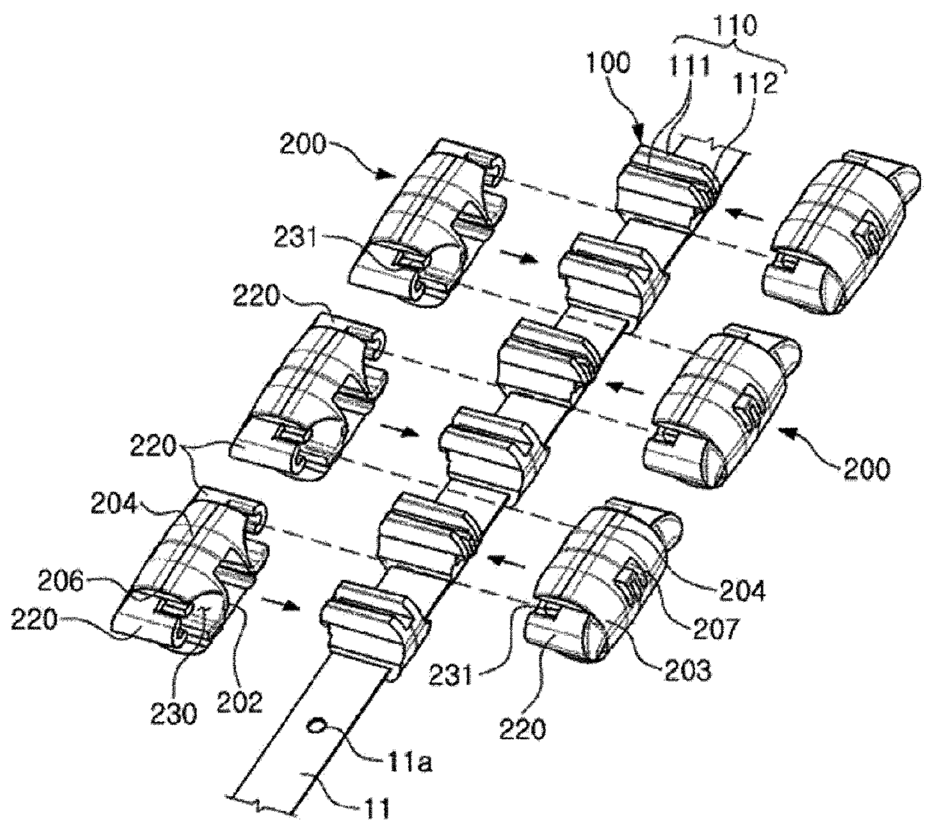

[Fig 6a]
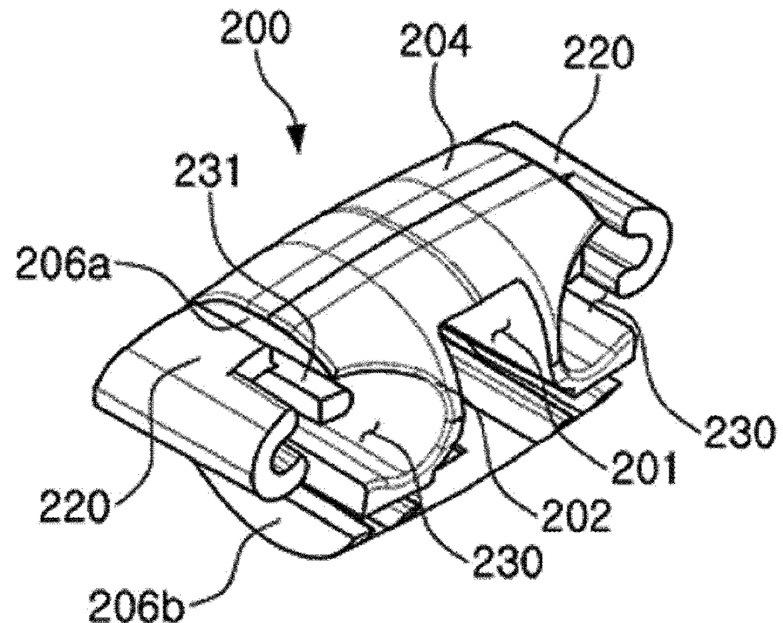
(a)
[Fig 6b]
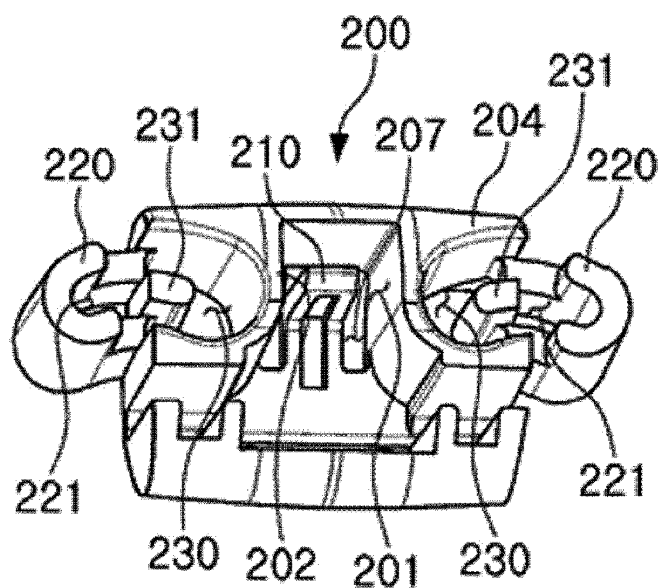
(b)

[Fig 6c]
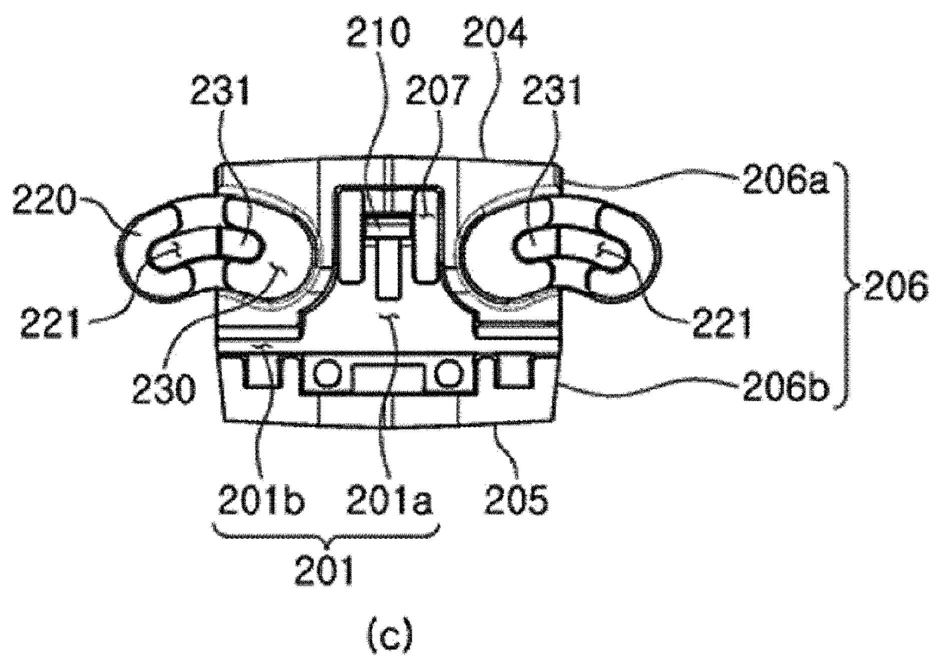
(c)
[Fig 7a]
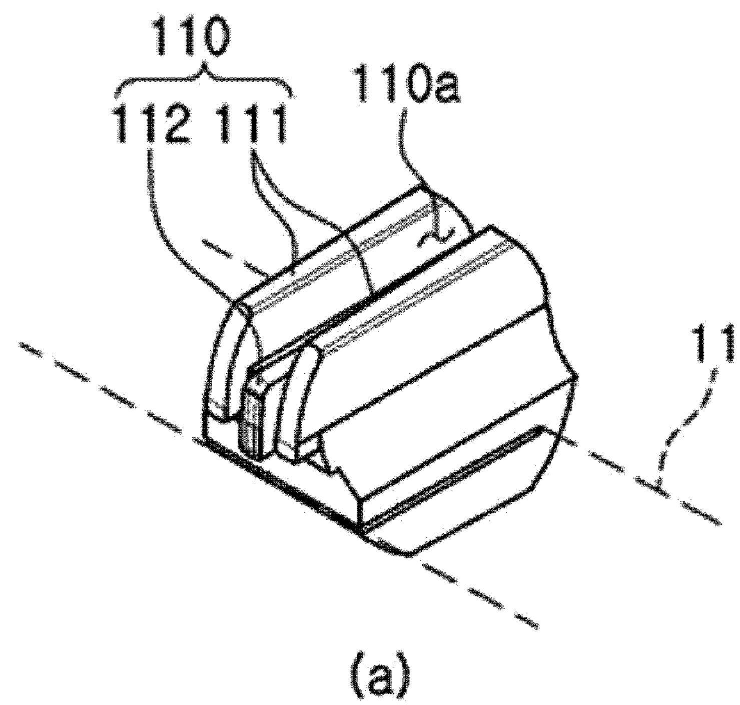
(a)

[Fig 7b]
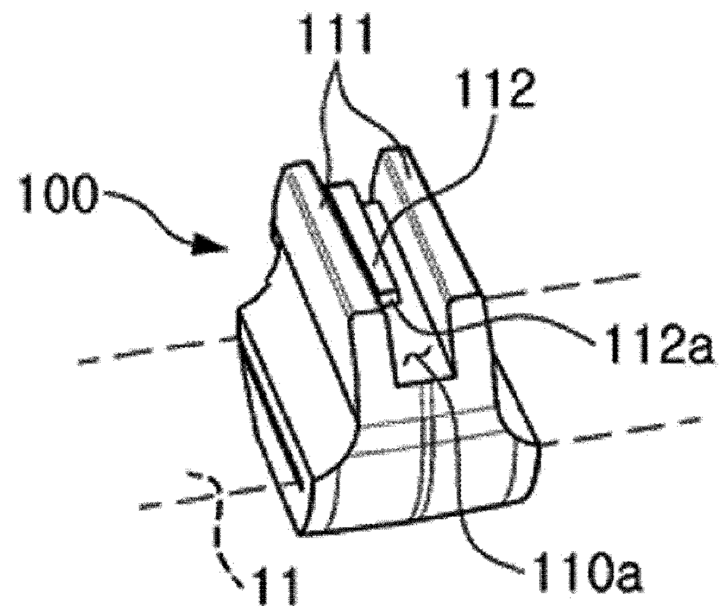
(b)
[Fig 7c]
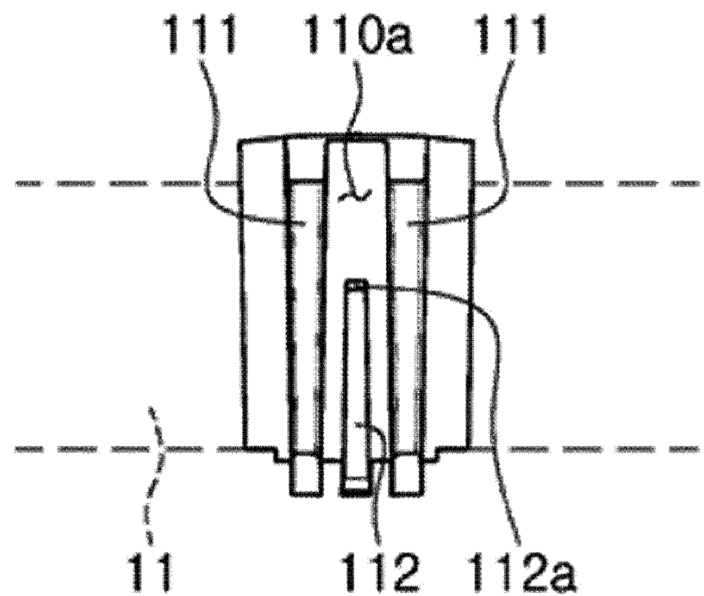
(c)

[Fig 8a]
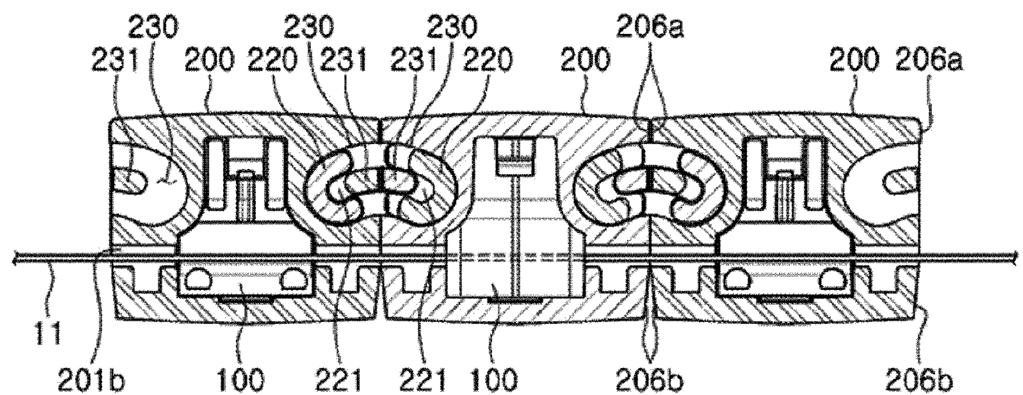
(a)
[Fig 8b]
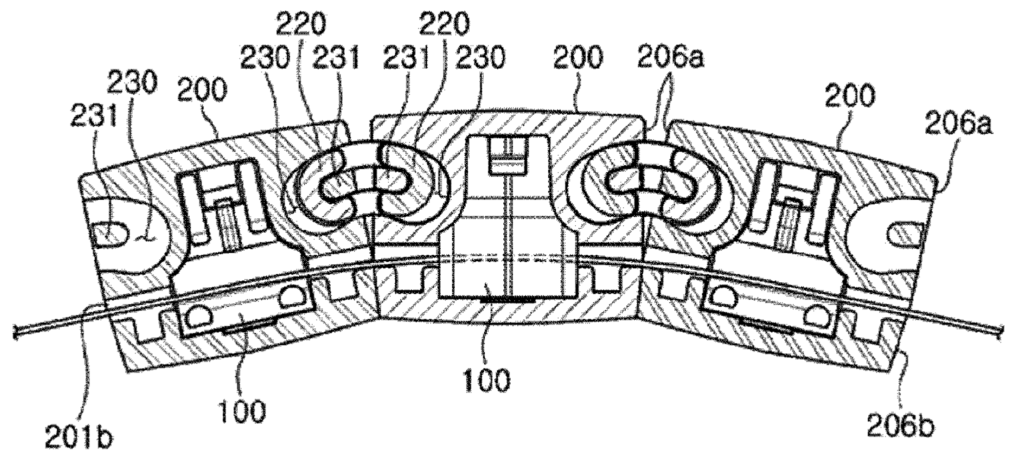
(b)

CABLE SUPPORT MODULE AND CABLE UNIT COMPRISING SAME

RELATED APPLICATIONS

The present application is a national phase filing under 35 USC 371 of International Application No. PCT/KR2020/000765, filed on Jan. 16, 2020, the entire contents and disclosures of which are hereby incorporated by reference.

TECHNICAL FIELD

The present invention relates to a cable support module and to a cable unit comprising same.

BACKGROUND ART

Cables are used in order to supply power or transmit signals in mechanical equipment used in clean rooms such as displays, OLEDs, LCDs and semiconductors. The mechanical equipment repetitively moves along various movement paths which are designed in advance to match the process characteristics. In this case, there are instances where the cables become entangled or twisted due to the movement of the mechanical equipment.

In order to securely protect the cables while moving, measures have been suggested in which cables are accommodated inside a flexible pod, and have articulated chains disposed on both sides so the cables are guided and able to maintain a straight state or bent state and move.

However, when the articulated chain is bent, the pod has folding creases along the bending radius. Also, in a process of repeatedly bending and straightening, there is the issue of the folding creases ripping or dust being made due to the friction of the articulated chain.

In addition, when the pod is disposed overlapping in multiple layers, there is a problem in that friction increases between the pod disposed to the inside and the pod disposed to the outside with respect to the bent radius due to the folding creases that occur in the bent position so dust is generated and the pod rips. In particular, when the cable simultaneously moves in the length direction and width direction, there is the issue that the arrangement stacked as multiple layers cannot be maintained and slips and separates.

DETAILED DESCRIPTION OF THE INVENTION

Technical Problem

The object of the present invention is to provide a cable support module and cable unit comprising same which improves product reliability and is capable of stably maintaining a stacked arrangement by means of preventing ripping and dust generation due to friction by minimizing the occurrence of folding creases in the bent position as described above.

However, the object of the present invention is not just limited thereto, and includes objects and effects which can be understood from the means of solving the problem and embodiments described below even if not explicitly mentioned.

Means of Solving the Problem

The cable support module according to an illustrative embodiment of the present invention comprises: a metal plate which is flexible and the bending position of which varies along the length direction; fixing blocks which are fastened to the metal plate in a form wrapping around the upper surface and bottom surface of the metal plate, and a plurality of which are arranged at fixed intervals along the length direction of the metal plate; and connection blocks which have openings on one side surface that expose the accommodation groove therein so as to be fit-coupled to each fixing block together with the metal plate, and a plurality of which are arranged in series adjacent to each other so as to be continuously connected such that mutual rotation is possible, wherein the connection blocks can be coupled to each fixing block in a zig-zag from both lateral sides along the length direction of the metal plate, and can be alternately connected together in a zig-zag along the length direction of the metal plate between adjacent connection blocks.

The connection blocks have curved surfaces on the one side surface which is partially open to expose the accommodation groove, on the other side surface facing the side surface and on the top surface and bottom surface which connect the side surfaces such that the connection blocks have a circular exterior when connected in succession, wherein the exposed surface of the fixing block which is exposed by the opening for the accommodation groove when inserted in the accommodation groove and coupled to the connection block can have a curved surface which is continuous with the curved surface on the one surface of the connection block.

The connection block is provided with connection portions which respectively protrude to the outside of both end surfaces, and connection grooves which accommodate the connection portion, wherein the connection portion and connection groove are provided in positions mutually facing each other on each end surface, so that the connection portion of the connection block can be accommodated in the connection groove provided on another adjacent connection block so as to be connected to the connection portion provided on the other adjacent connection block.

The connection portion extends downward and outward in a circular arc on both end surfaces respectively, while the end portion has a semi-circular structure and has provided therein a guide groove that is open to the outside through the side surface of the connection block, wherein the connection groove can be a circular arc depressed toward the accommodation groove on each end surface of the connection block to provide a structure that is open to the outside through the side surface.

The portion connected to the guide groove of the connection groove is provided with a guide rod that protrudes toward the side surface, wherein the guide rod is inserted into the guide groove provided on the connection portion of another adjacent connection block when the connection portion of the connection block is connected to the connection portion of the other adjacent connection block such that the guide rod moves along the arcuate trajectory provided by the guide groove and the rotation of the connection block can be guided.

The accommodation groove comprises a first accommodation groove which accommodates the fixing block and a second accommodation groove which accommodates the metal plate, wherein the second accommodation groove is continuously connected to the first accommodation groove at the lower portion of the first accommodation groove, and so the accommodation groove can be provided as a structure which extends and passes through both end surfaces of the connection block facing another adjacent connection block.

The connection block has an asymmetrical structure in which the size of cross-section decreases from the center towards both end surfaces, wherein both end surfaces of the connection block may comprise a first surface which contacts the end surface of another adjacent connection block when the metal plate is horizontal, and a second surface which contacts the end surface of the other adjacent connection block when the metal plate is bent.

The fixing block is provided with a fastening portion which fits into an insertion hole provided on the other side surface of the connection block when fit-coupled to the connection block and which has a partially exposed end portion, wherein the fixing block can be alternately arranged with the end portions of the fastening portion in a zig-zag along the length direction of the metal plate when the fastening portion is extended in the width direction perpendicular to the length direction of the metal plate.

The fastening portion comprises a pair of upper protrusions which protrude upward, and a central protrusion which protrudes to a lower height than the upper protrusions from the upper groove formed between the pair of upper protrusions, wherein the central protrusion is provided at a shorter length than the upper protrusions, thereby forming a difference in level with respect to the surface of the upper groove.

The cable unit according to an illustrative embodiment of the present invention may comprise: a jacket in which a plurality of first accommodation portions, that have a tubular structure and extend in the length direction, are connected in the width direction so as to be disposed in parallel, and a pair of second accommodation portions, that each have a tubular structure and extend in the length direction, are connected to both side ends in the width direction of the first accommodation portion so as to be disposed in parallel with the plurality of first accommodation portions; electrical cables accommodated inside the first accommodation portions; and a cable support module accommodated inside the second accommodation portion.

Advantages of the Invention

According to one embodiment of the present invention, a cable support module and cable unit comprising same may be provided, which improves product reliability and is capable of stably maintaining a stacked arrangement by means of preventing ripping and dust generation by minimizing the occurrence of folding creases in the bent position.

The various and useful advantages and effects of the present invention are not limited to those described above, and should be easier to comprehend from the specific embodiments of the present invention described.

BRIEF DESCRIPTION OF THE DRAWINGS

FIG. 1 is a perspective view schematically showing the cable unit according to an illustrative embodiment of the present invention.

FIG. 2 is a cross-section of the cable unit in FIG. 1 cut along the I-I' line.

FIG. 3 is a perspective view schematically showing the cable support module in the cable unit in FIG. 1.

FIG. 4 is an enlarged perspective view of section 'A' in the cable support module in

FIG. 3.

FIG. 5 is an exploded perspective view schematically showing the cable support module in FIG. 3.

FIGS. 6*a* to 6*c* are drawings showing the connection block in the cable support module at various angles.

FIGS. 7*a* to 7*c* are drawings showing the fixing block in the cable support module at various angles.

FIGS. 8*a* and 8*b* are drawings schematically showing the respective connection blocks when connected to each other.

MODES FOR CARRYING OUT THE INVENTION

Hereinbelow, preferred embodiments are described in detail with reference to the accompanying drawings such that a person skilled in the art to which the present invention belongs could easily implement the present invention. The preferred embodiments of the present invention are described in detail, but where a detailed description of a relevant known function or configuration is determined to unnecessarily obfuscate the key features of the present invention a detailed description has been omitted. Also, parts with similar functions or operations use the same reference numerals across all the drawings.

In addition, throughout the specification, where a certain part is 'connected' to another part, this includes instances of being 'directly connected' as well as being 'indirectly connected' with another element placed therebetween. Also, where a certain constituent element is 'included', this means that unless specifically stated otherwise does not exclude other undisclosed constituent elements and may further include other constituent elements.

The cable unit according to an illustrative embodiment of the present invention is described with reference to FIGS. 1 and 2. FIG. 1 is a perspective view schematically showing the cable unit according to an illustrative embodiment of the present invention, and FIG. 2 is a cross-section of the cable unit in FIG. 1 cut along the I-I' line.

Referring to FIGS. 1 and 2, the cable unit (1) according to an illustrative embodiment of the present invention may comprise a cable support module (10), an electrical cable (20), and a jacket (30).

The electrical cable (20) can be used to supply power or to transmit an electrical signal to the mechanical equipment, e.g. semiconductor equipment, which has the cable unit (1) installed thereon. A plurality of electrical cables (20) may be used depending on the usage.

The cable support module (10) may have a circular cross sectional structure and an articulated round bar structure overall.

The cable support module (10) may comprise a metal plate (11) which has a long belt shape in the length direction and has a bending position that varies along the length direction, and is configured such that a plurality of block bodies (12) are fastened adjacent to each other and disposed in series on the metal plate (11). Each block body (12) has a circular exterior, and a round bar structure with the metal plate (11) embedded therein can be achieved.

The cable support module (10) will be described in detail later.

The jacket (30) may comprise first accommodation portions (31) and second accommodation portions (32) which have a tubular structure and extend in the length direction.

The first accommodation portions (31) may be connected as a plurality in the width direction so as to be disposed in parallel. The second accommodation portions (32) may be respectively connected to each side end in the width direction so as to be disposed in parallel with the plurality of first accommodation portions (31). That is to say, the plurality of first accommodation portions (31) may have a structure in which they are arranged in a line between the second accommodation portions (32).

In one embodiment, the length direction and width direction can be construed as the X-axis direction and Y-axis direction in each of the drawings.

The jacket (30), for example, may be achieved by bonding two flexible resin sheets to each other in the length direction to form isolated internal spaces between the sheets, each space having a fixed cross sectional size and which constitute the first accommodation portions (31) and the second accommodation portions (32).

The electrical cable (20) may be accommodated and protected inside the first accommodation portion (31). The number of electrical cables (20) accommodated inside each of the first accommodation portions (31) may vary and change depending on the characteristics of the semiconductor equipment.

The cable support module (10) is accommodated inside the second accommodation portion (32) so as to be able to support the jacket (30) including the electrical cable (20) without sagging, and to guide movement. In particular, the cable support module (10) has a circular exterior with respect to the cross section and so can be disposed in close contact with the inner surface of the second accommodation portion (32) which has a tubular structure. Accordingly, the second accommodation portion (32) may not have a space or gap between itself and the cable support module (10) accommodated therein.

In conventional cable units, an articulated chain has an angular quadrilateral-shaped cross section and when accommodated inside a pod having a tubular structure, there is a gap (or a space) between the chain and the inner surface of the mostly round pod. When the articulated chain is bent, folded creases occur along the bending radius due to the space between the articulated chain and the pod.

As described above, the cable unit (1) according to the present embodiment has a cable support module (10) with a circular exterior and which is disposed in close contact with the inner surface of the second accommodation portion (32) having a tubular structure so that there is no space (gap) between the cable support module and the second accommodation portion (32), thereby allowing the occurrence of folding creases in the second accommodation portion (32) to be prevented or minimized when the cable support module (10) is bent.

The cable support module according to an illustrative embodiment of the present invention is described with reference to FIGS. 3 to 8.

FIG. 3 is a perspective view schematically showing the cable support module in the cable unit in FIG. 1, FIG. 4 is an enlarged perspective view of section 'A' in the cable support module in FIG. 3, and FIG. 5 is an exploded perspective view schematically showing the cable support module in FIG. 3. FIGS. 6*a* to 6*c* are drawings showing the connection block in the cable support module at various angles, FIGS. 7*a* to 7*c* are drawings showing the fixing block in the cable support module at various angles, and FIGS. 8*a* and 8*b* are drawings schematically showing the respective connection blocks when connected to each other.

Referring to the drawings, the cable support module (10) according to an illustrative embodiment of the present invention may comprise a metal plate (11) and block bodies (12) constituted by fixing blocks (100) and connection blocks (200).

The metal plate (11) has a belt shape extending far in the length direction and is flexible so the bending position can vary along the length direction. The metal plate (11) can be made of a material such as aluminum for example, but is not limited thereto.

A plurality of through holes (11*a*) may be formed spaced a fixed interval apart along the length direction on the metal plate (11).

The fixing block (100) may be fastened to the metal plate by enclosing the top surface and bottom surface of the metal plate (11). For example, the fixing block (100) may be injection molded at the locations where each through hole is formed in the metal plate (11). The fixing blocks (100) may be arranged as a plurality at fixed intervals along the length direction of the metal plate (11).

The connection block (200) has openings on one side surface which expose the accommodation groove (201) inside so that the connection block can be fit-coupled to each fixing block (100) together with the metal plate (11). The connection blocks (200) are arranged as a plurality in series next to each other so that they can be continuously connected such that mutual rotation is possible.

The fixing blocks (100) and connection blocks (200) can be coupled to each other to configure the block body (12). The block bodies (12) constituted by the fixing blocks (100) and the connection blocks (200) can be coupled as an adjacent plurality and disposed in series so as to achieve an articulated structure.

The connection blocks (200) have curved surfaces on the one side surface (202) which is partially open to expose the accommodation groove (201), on the other side surface (203) facing the side surface (202) and on the top surface (204) and bottom surface (205) which connect the side surfaces (202,203) such that the connection blocks have a circular exterior when connected in succession. That is to say, the connection blocks (200) may have a cylindrical structure with a circular cross section. Also, the connection blocks may have an asymmetrical structure in which the size of cross-section decreases from both end surfaces (206) toward the center.

The exposed surface of the fixing block (100) which is exposed by the opening for the accommodation groove (201) when inserted in the accommodation groove (201) and coupled to the connection block (200) can have a curved surface which is continuously connected with the curved surface on the one surface (202) of the connection block (200). Accordingly, the side surface (202) of the connection block (200) can maintain a continuous curved surface overall.

The accommodation groove (201) may comprise a first accommodation groove (201*a*) which accommodates the fixing block (100) and a second accommodation groove (201*b*) which accommodates the metal plate (11).

The first accommodation groove (201*a*) may be provided with a catching protrusion (210) which catches and fixes the fixing block (100) when the fixing block (100), that will be described later, is fit-coupled. The catching protrusion (210) may be formed protruding from the first accommodation groove (201*a*) toward the side surface (202) which is open, and can prevent easy separation from the fixing block (100).

The second accommodation groove (201*b*) is continuously connected to the first accommodation groove (201*a*) at the lower portion of the first accommodation groove (201*a*), and so the accommodation groove can be provided as a structure which extends and passes through both end surfaces (206) in the length direction of the connection block (200) facing another adjacent connection block (200).

Both end surfaces (206) of the connection block (200) may comprise a first surface (206*a*) which contacts the end surface of another adjacent connection block (200) when the metal plate (11) is horizontal, and a second surface (206*b*) which contacts the end surface (206) of the other adjacent connection block (200) when the metal plate (11) is bent. The second surface (206*b*) may have an inclined structure with respect to the first surface (206*a*).

The connection block (200) is provided with connection portions (220) which respectively protrude to the outside of both end surfaces (206) facing the other adjacent connection blocks (200), and connection grooves (230) which accommodate the connection portion (220). The connection portion (220) and connection groove (230) can be provided in positions facing each other from each end surface (206).

The connection portion (220) of the connection block (200) can be accommodated in the connection groove (230) provided on another adjacent connection block (200) so as to be connected to the connection portion (220) provided on the other adjacent connection block (200).

The connection portions (220) each protrude outward from both end surfaces (206) of the connection block (200) and extend downward, while the end portion has a semi-circular structure and may have provided therein a guide groove (221) that is open to the outside through the side surface (202) of the connection block (200).

The connection groove (230) can be a circular arc depressed inward toward the accommodation groove (201) on each end surface (206) of the connection block (200) to provide a structure that is open to the outside through the side surface (202) of the connection block (200).

In one embodiment, the outer border of the connection portion (220) and the inner border of the connection groove (230) may have a structure with lateral mirror symmetry with respect to the end surfaces (206) of the connection block (200).

Meanwhile, the portion connected to the guide groove (221) of the connection groove (230) can be provided with a guide rod (231) that protrudes toward the open side surface (202) of the connection block (200).

The guide rod (231) is inserted into the guide groove (221) provided on the connection portion (220) of another adjacent connection block (200) when the connection portion (220) of the connection block (200) is connected to the connection portion (220) of the other adjacent connection block (200) such that the guide rod (231) moves along the arcuate trajectory provided by the guide groove (221) and the rotation of the connection block (200) can be guided.

The fixing block (100) can be provided with a fastening portion (110) which has an overall shape corresponding to the first accommodation groove (201*a*), fits into an insertion hole (207) provided on the other side surface (203) of the connection block (200) when fit-coupled to the connection block (200) and has a partially exposed end portion.

The fastening portion (110) can comprise a pair of upper protrusions (111) which protrude upward, and a central protrusion (112) which protrudes to a lower height than the upper protrusions (111) from the upper groove (110*a*) formed between the pair of upper protrusions (111). The pair of upper protrusions (111) extend in parallel in the width direction perpendicular to the length direction of the metal plate (11), and the central protrusion (112) can be provided at a shorter length than the upper protrusions (111) and have a catching ledge (112*a*) that reaches the step and surface of the upper groove (110*a*).

The extended end portions of the fastening portion (110) can be provided as a structure protruding outward from the fixing block (100). Also, the direction that the protruding end portions of the fastening portion (110) are positioned in can be defined as the coupling direction with the connection block (200). That is to say, it can be fit-coupled to the accommodation groove (201) of the connection block (200) which is open toward the protruding end portions of the fastening portion (110).

The fixing block (100) fits and moves in a sliding direction in the first accommodation groove (201*a*) of the connection block (200), and the catching protrusion (210) of the first accommodation groove (201*a*) is disposed between the pair of upper protrusions (111) of the fastening portion (110) so that the sliding movement of the fastening portion (110) can be guided. Also, the protruding end portions of the fastening portions (110) fit in the insertion holes (207) of the connection block (200), and the ends of the catching protrusions (210) catch in a snap-fit manner on the catching ledge (112*a*) of the central protrusion (112), thereby the fixing block (100) can be fit-coupled to a first accommodation groove (201*a*).

In one embodiment, the fixing block (100) can be alternately arranged on both lateral sides with the protruding end portions of the fastening portion (110) in a zig-zag along the length direction of the metal plate (11) when the fastening portion (110) is extended in the width direction perpendicular to the length direction of the metal plate (11).

The connection block (200) can be fit-coupled to each fixing block (100) together with the metal plate (11) in the direction in which the open side surface (202) that exposes the accommodation groove (201) faces the protruding end portions of the fastening portion (110). That is to say, the connection blocks (200) can be fitted to each fixing block (100) in a zig zag from along the length direction of the metal plate (11) toward the protruding end portions of the fastening portions (110) on both lateral sides in the width direction of the metal plate (11).

The connection block (200) is fit-coupled to each fixing block (100) as a structure in which the open side surface (202) mutually faces the open side surface (202) of another adjacent connection block (200), and thus the connection portion (220) of the connection block (200) is inserted into the connection groove (230) of the other adjacent connection block (200), and can be mutually connected in a structure in which the connection portion (220) of the other adjacent connection block (200) is inserted the connection groove (230) of the connection block (200).

Also, the guide rod (231) provided in the connection groove (230) of the connection block (200) can be inserted into the guide groove (221) provided on the connection portion (220) of another adjacent connection block (200), and the guide rod (231) provided in the connection groove (230) of the other adjacent connection block (200) can be inserted into the guide groove (221) provided on the connection portion (220) of the connection block (200).

When the connection blocks (200) in the mutually connected state are unfolded so that the metal plate (11) is horizontal as a result of the operation of the cable support module (10) such that the first surface (206*a*) of the connection block (200) contacts the first surface (206*a*) of another adjacent connection block (200), the majority of the connection portions (220) can be accommodated in the connection groove (230) in a structure where the connection portion (220) of the connection block (200) overlaps the connection groove (230) of the other adjacent connection block (200). In this case, the guide rod (231) of the connection block (200) and the guide rod (231) of another adjacent connection block (200) can be arranged in a position spaced apart from the end portions of each connection portion (220) inside the guide groove (221) of each connection portion (220) in mutually close contact.

In addition, when the metal plate (11) bends into a bent state such that the first surface (206*a*) of the connection block (200) separates from the first surface (206*a*) of another adjacent connection block (200) and the second surface (206*b*) of the connection block (200) contacts the second surface (206*b*) of the other adjacent connection block (200), the connection portions (220) of the connection block (200) come out of the connection groove (230) of the other adjacent connection block (200) and so may be partially accommodated in the connection groove (230). In this case, the guide rod (231) of the connection block (200) and the guide rod (231) of another adjacent connection block (200) can be moved along the arcuate trajectory provided by the guide groove (221) of the connection portion (220) to a mutually separated state and arranged on the end portions of each connection portion (220).

As described above, the connection blocks (200) fit to each fixing block (100) in a zig zag on both lateral sides along the length direction of the metal plate (11) and catch on and connect to each fixing block (100) in a snap-fit manner, and are alternately connected together in a zig zag along the length direction of the metal plate (11) by means of the connection portions (220) between the adjacent connection blocks (200), thereby the connection blocks (200) can maintain a stable and sturdy connection therebetween even if the location where the metal plate (11) is bent along the length direction changes, and distortion can be prevented.

The embodiments of the present invention have been described above with reference to the accompanying drawings, but a person skilled in the art to which the present invention belongs should understand that the present invention can be implemented in other specific forms without changing the technical spirit or essential features. Therefore, the embodiments described above should be understood to be merely illustrative in all aspects and not limiting.

INDUSTRIAL APPLICABILITY

The embodiments of the present invention can be used to provide a cable support module and cable unit comprising same which improves product reliability and is capable of stably maintaining a stacked arrangement by means of preventing ripping and dust generation due to friction by minimizing the occurrence of folding creases in the bent position.

The invention claimed is:

1. A cable support module comprising:

a flexible metal plate;

wherein a bending position of the flexible metal plate varies along a length direction of the flexible metal plate;

fixing blocks fastened to the flexible metal plate;

wherein the fixing blocks wrap around an upper surface and a bottom surface of the flexible metal plate;

wherein a plurality of the fixing blocks are arranged at fixed intervals along the length direction of the flexible metal plate; and connection blocks comprising openings on one side surface that expose an accommodation groove therein so as to be fit-coupled to each fixing block together with the flexible metal plate, wherein a plurality of the connection blocks are arranged in series adjacent to each other so as to be continuously connected such that mutual rotation is possible, wherein the connection blocks are coupled to each fixing block in a zig-zag from lateral sides of the flexible metal plate, along the length direction of the flexible metal plate, wherein the connection blocks are alternately connected together in a zig-zag along the length direction of the flexible metal plate between adjacent connection blocks.

2. The cable support module as claimed in claim 1, wherein each of the connection blocks have curved surfaces on:

i) a first side surface which is partially open to expose the accommodation groove, ii) a second side surface facing the first side surface, iii) a top surface, and iv) a bottom surface;

wherein the top surface and the bottom surface connect the first side surface and the second side surface such that the connection blocks have a circular exterior when connected in succession, and wherein an exposed surface of each of the fixing blocks which is exposed by an opening for the accommodation groove when inserted in the accommodation groove and coupled to one of the connection blocks, is a curved surface;

wherein the curved surface of each of the fixing blocks is continuous with one of the curved surfaces of at least one of the connection blocks.

3. The cable support module as claimed in claim 2, wherein the fixing block comprises a fastening portion which fits into an insertion hole provided on the second side surface of the connection block when fit-coupled to the connection block, wherein the fastening portion has a partially exposed end portion, and wherein the fixing block is alternately arranged with end portions of the fastening portion in a zig-zag along the length direction of the flexible metal plate when the fastening portion is extended in a width direction perpendicular to a length direction of the flexible metal plate.

4. The cable support module as claimed in claim 3, wherein the fastening portion comprises a pair of upper protrusions which protrude upward, and a central protrusion which protrudes to a lower height than the upper protrusions from an upper groove formed between the pair of upper protrusions, and wherein the central protrusion has a shorter length than the upper protrusions so that the central protrusion can reach a step and a surface of the upper groove.

5. The cable support module as claimed in claim 1, wherein each of the connection blocks is provided with:

i) connection portions which respectively protrude to an outside of a first end surface and a second end surface of each of the connection blocks, and ii) connection grooves which accommodate the connection portions, wherein the connection portions and the connection grooves are provided in positions mutually facing each other on each of the first end surface and the second end surface, and wherein the connection portions of the connection blocks are accommodated in the connection groove provided on an adjacent connection block so as to be connected to the connection portions provided on the adjacent connection block.

6. The cable support module as claimed in claim 5, wherein the connection portions extend downward and outward in a circular arc on each of the first end surface and the second end surface, wherein an end portion of each of the connection portions has a semi-circular structure comprising a guide groove that is open to an outside of the connection blocks through the first side surface of the connection blocks, and wherein each of the connection grooves is a circular arc depressed toward the accommodation groove on each of the first end surface and the second end surface of the connection block to provide a structure that is open to the outside of the connection block through one of the first side surface and the second side surface.

7. The cable support module as claimed in claim 6, wherein the connection groove comprises a guide rod that protrudes toward the first side surface, and wherein the guide rod is inserted into the guide groove provided on the connection portion of an adjacent connection block when the connection portion of the connection block is connected to the connection portion of the adjacent connection block such that the guide rod moves along the arcuate trajectory provided by the guide groove such that rotation of the connection block can be guided.

8. The cable support module as claimed in claim 1, wherein the accommodation groove comprises a first accommodation groove which accommodates the fixing block and a second accommodation groove which accommodates the flexible metal plate, and wherein the second accommodation groove is continuously connected to the first accommodation groove at a lower portion of the first accommodation groove, and wherein the accommodation groove extends and passes through each of the first end surface and the second end surface of the connection block facing an adjacent connection block.

9. The cable support module as claimed in claim 1, wherein the connection block has an asymmetrical structure in which a size of a cross-section thereof decreases from each of the first end surface and the second end surface toward a center of the connection block, and wherein each of the first end surface and the second end surface of the connection block comprises a first surface which contacts the first end surface of a first adjacent connection block when the flexible metal plate is horizontal, and a second surface which contacts the second end surface of a second adjacent connection block when the flexible metal plate is bent.

10. A cable unit comprising:

a jacket comprising:

a plurality of first accommodation portions connected in a width direction so as to be disposed in parallel, wherein the plurality of first accommodation portions are tubular structure and extend in a first length direction and a pair of second accommodation portions connected to both side ends in the width direction of the plurality of first accommodation portions so as to be disposed in parallel with the plurality of first accommodation portions;

wherein the pair of second accommodation portions are tubular and extend in a second length direction;

electrical cables accommodated inside the plurality of first accommodation portions; and a cable support module accommodated inside the pair of second accommodation portions, wherein the cable support module is the cable support module as claimed in claim 1.

* * * * *